Jan. 16, 1968   J. H. LEMELSON   3,364,292
METHOD OF POSITIONING AND MOLDING A PREFORM INTEGRAL WITH
PLASTIC MATERIAL BY ROTATIONAL CASTING
Filed May 17, 1963
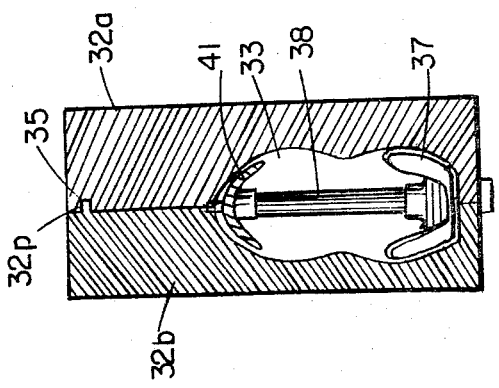
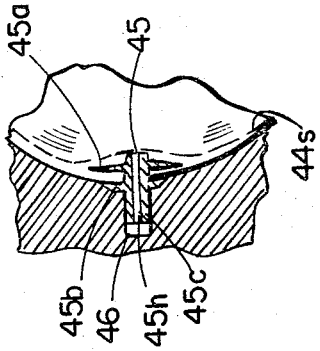
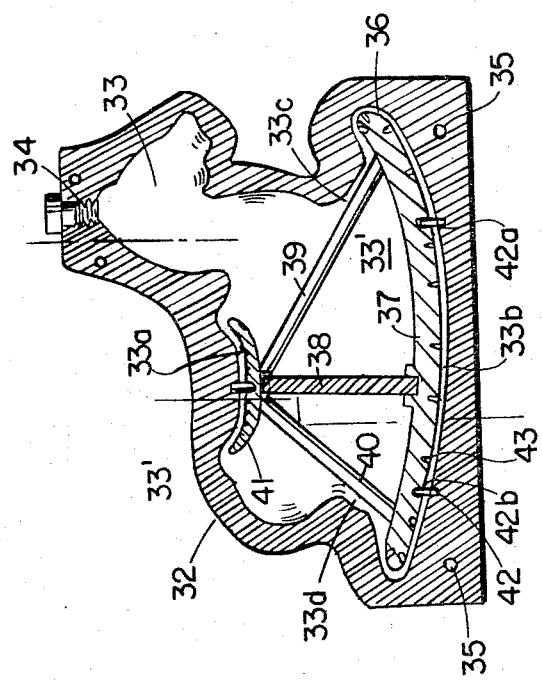
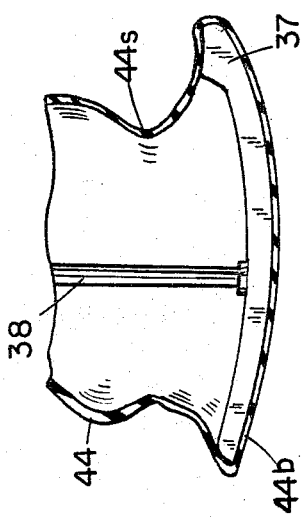
INVENTOR.
JEROME H. LEMELSON

United States Patent Office 3,364,292
Patented Jan. 16, 1968

3,364,292
METHOD OF POSITIONING AND MOLDING A PREFORM INTEGRAL WITH PLASTIC MATERIAL BY ROTATIONAL CASTING
Jerome H. Lemelson, 85 Rector St., Metuchen, N.J. 08840
Continuation-in-part of application Ser. No. 732,937, May 5, 1958. This application May 17, 1963, Ser. No. 281,306
9 Claims. (Cl. 264—275)

This invention relates to a method of molding hollow bodies and is a continuation-in-part of my copending application Ser. No. 732,937 entitled Molded Articles and Supports Therefor which was filed on May 5, 1958, now abandoned.

It is known in the art to mold light-weight, hollow bodies of plastic materials by charging a quantity of fluent plastic into a mold, rotating said mold to distribute the plastic against the walls of the mold cavity and causing said plastic to solidify into a hollow body conforming to the shape of said mold cavity. Various liquid and powdered plastic materials may be molded into hollow body shapes by so-called rotational or slush molding techniques. In rotational molding, the plastic is generally distributed around the walls of the mold about two or more axes while the mold is heated. In slush molding the plastic closest to the mold wall is allowed to solidify to a predetermined depth after which the excess charge is poured out of the mold.

Articles molded by rotational or slush molding techniques are generally thin walled although relatively heavy wall thicknesses may be fabricated by either admitting a greater charge to the mold for rotational molding and solidifying all of said charge or maintaining the slush molding charge in the mold for a longer period of time to solidify a greater amount of plastic to define a thicker wall for the molded body. Thin walled hollow shapes, so molded, may easily collapse or locally buckle when subjected to light loads. Increasing the wall thickness to solve this problem may be uneconomical due to the greater cost of material and increase in molding time, hence the application of these techniques to the production of many useful articles has been rather limited.

The only object of this invention is to provide a method for fabricating a thin walled hollow article by rotational molding and providing a structural support within said article during the molding operation.

These and other objects and advantages will become more apparent upon reference to the following description taken in connection with the accompanying drawings, wherein:

FIG. 1 is a side cross sectional view of a mold part with an article support attached thereto;

FIG. 2 is an end view in cross-section of the mold of FIG. 1 shown assembled with another mold part to define a molding cavity;

FIG. 3 is a partial side cross-section of an article molded in the apparatus of FIGS. 1 and 2;

FIG. 4 is a fragmentary view in cross section of a mold and article showing means for integrally molding a component on the article.

FIGS. 1 to 4 show details of a mold for slush, rotationally or blow molding articles such as a large hollow figure with relatively thin walls and provided with rigid internal support means therefore. Means are shown for integrally securing an internal support means within said shell during the molding thereof. The mold 32 comprises an assembly of mold sections 32a and 32b which provide an enclosed cavity 33 upon assembly, provides a molding surface having the shape of a hobby-horse with means for forming a broad base in a laterally extended lower portion 33′ of cavity 33. Pins 32p secured to the mold half section 32b, align with and are held by insertion in holes 35 in either or both mold sections to assure alignment of the internal support upon assembly of the mold. An inlet 34 is utilized for the admission of a predetermined quantity of liquid or powdered plastic to the cavity and if necessary the drawing off or out-flow of excess plastic therefrom if known slush molding techniques are employed using liquid vinyl plastisols or molten polyethylene. Vinyl plastisols or powdered thermoplastics will require heating the walls of the mold whereas a molten blend of polyethylenes having a viscosity in the range of 5000 to 10,000 centipoises, containing so called low molecular weight polyethylene at approximately 300° F., will begin to solidify near the wall of the mold due to cooling shortly after being placed therein. For techniques which require removal of excess plastic, this may be attained by projecting a pipe or tube through either of the gates or valves 34 or 34′ and drawing off said excess.

Mounted within the mold 32 is a supporting frame or skeleton 36 of rigid elements comprising of a base 37, a plurality of uprights 38, 39 and 40 and a saddle 41 supported by said uprights. The frame 36 is supported on a plurality of pins 42 designated 42a, 42b, etc. such that surfaces thereof are positioned, upon an assembly of said frame with said mold on said pins, less than ¼ of an inch away from adjacent surfaces of said mold as shown so that sheet-like cavities including spaces 33a and 33b are provided into which plastic may flow during molding which, upon solidification, will adhere to said frame surface. The shell or thin wall 44s of the body 44, shown in FIG. 3, will thus be supported by part of said frame and when said body is removed from said mold, said frame will be essentially integrally secured within said shell. The sheet volume cavity 33b between the base 37 and the bottom of the mold cavity forms the bottom wall 44b of the molded body 44 and the sheet-like cavity 33a between the top of the saddle 41 forms part of the upper wall or roof of body 44. Similarly, cavities 33c and 33d define mold cavity volumes in which front and rear portions of the body 44 are molded and are preferably of such width that the wall portions formed therein extend to the uprights 39 and 40 and are adhesively secured thereto. In order to enhance the securing of the molded shell 44s to the skeleton portions it abuts, a plurality of holes 43 are provided in said abutting frame surfaces into which plastic will flow and form protrusions integral with the body 44 during the slush molding of the body which prevent lateral slippage of the surfaces of said frame and the body surface abutting it and, in addition, enhance the securing function by providing increased bonding area therewith. The multiple holes 43 may extend entirely through the members in which they are drilled and may also extend at angles oblique to the surfaces in which they are formed thereby providing further resistance to forces tending to tensionally pull the skin or body 44s or 44 off the frame. Although not shown, the uprights 38 to 40 may abut the side-walls of the skin 44s with or without being adhered thereto in the manner described. In the actual slush molding of the object, part of which is shown in FIG. 3, the plastic material will coat the frame or skeletal structure as well as the surfaces of the mold cavity. Since the sheet-like cavities 33′ will be filled with plastic when the article is completed and said plastic will extend to and be integrally joined with the plastic coating the adjacent rigid skeletal member, such as base 37 or saddle 41, said adjacent parts of said skeletal frame are actually encased in a plastic shell, a wall of which comprises the skin 44s of the hollow body 44 as shown in FIG. 3.

The pins 42 engage the bottoms of respective holes in the skeletal members 37 and 41 and the bottoms of holes of essentially the same diameter as said pins which are formed when the two mold-halves are assembled, each of said holes being formed by providing matched semi-cylindrical cavities in the respective mold-halves projecting outward from the main cavity to a degree such that the skeletal frame will be held in the cavity 33 with surfaces thereof close to surfaces of said cavity so that the skin formed therein will extend and adhere to predetermined areas of said frame.

In FIG. 4 there is shown an improved means for providing a valve 45 integral with the slush molded shell or skin 44s for pressurizing the interior thereof if it is desired to further enhance the rigidity thereof. The valve 45 comprises an elongated stem 45c which may be externally threaded for receiving a cap or internally threaded to receive a plug or to mount a valve of the automobile tube type. A lateral circular shelf 45a is integrally formed near the other end of the stem and is adapted to be encased in the skin 44s of the molding formed against the wall of the cavity. The valve body 45c nests in a cylindrical cavity 46 formed upon assembly of the mold halves with a second circular shelf 45b nesting in a shallow sub-cavity such that the surface of 45b which faces 45a abuts the outer surface of the skin 44s and engages it in sandwich array therebetween and shelf 45a. An externally removable plug may be provided in the hole 45h during casting which may be removed thereafter. The plastic covering the inner end of the valve body 45c may be removed by pushing a rod or drill through hole 45h therein. If valve body 45c is solid, the hole 45h may be provided after valve body 45c is integrally cast therein.

While the foregoing description has set forth specific embodiments of the instant invention, various other embodiments and modifications will become obvious and it is desired that the scope of the instant invention should be limited only to the extent of the limitation of the claims as set forth below.

I claim:

1. A method of fabricating hollow objects with internally reinforced walls comprising the steps of:
    (a) assembling a multiple part mold with an elongated structural member extending across a cavity in said mold and supporting said member near both ends by securing it to opposite portions of the mold,
    (b) charging a quantity of plastic material into said mold,
    (c) moving said mold in a manner to cause said plastic material to become distributed as a coating around substantially the entire wall of said cavity,
    (d) causing said material to become disposed against portions of said structural member next to said opposite portions of the walls of said cavity,
    (e) solidifying said material into a hollow body formed against the walls of said mold cavity and said material disposed against said structural member whereby said structural member becomes integrally secured near its ends to the material solidified against said mold cavity walls, and serves as a support for opposite portions of the walls of said hollow body,
    (f) separating said mold parts and removing said hollow body from said mold with said structural member integrally retained therein and disposed so as to support the walls of said hollow body.

2. A method of fabricating hollow objects with internally reinforced walls comprising the steps of:
    (a) assembling a multiple part mold with an elongated structural member extending across a cavity in said mold and supporting said member near both ends by securing it to portions of the mold adjacent the cavity wall,
    (b) charging a quantity of plastic material into said mold,
    (c) rotating said mold in a manner to cause said plastic material to flow against the walls of said cavity,
    (d) distributing said plastic material against portions of said structural member and substantially the entire inside surface of the walls of said cavity,
    (d') heating said mold to melt said plastic material,
    (e) solidifying said material as a shell on the walls of said mold with part of said material solidified against said portions of said structural member and joined to said shell whereby said structural member becomes integrally secured to the material solidified against said mold cavity walls,
    (f) cooling said mold and removing said shell from said mold to provide a hollow body with said structural member integrally retained therein and disposed so as to support the walls of said body.

3. A method of fabricating hollow objects with internally reinforced walls comprising the steps of:
    (a) assembling a multiple part mold and securing a structural member across a cavity in said mold with said member supported by portions of the mold walls,
    (b) charging a quantity of plastic material into said mold,
    (c) rotating said mold to cause said plastic material to become distributed against substantially the entire wall of said cavity and portions of said elongated member adjacent opposite walls of said cavity,
    (d) heating said mold to melt said plastic material,
    (e) cooling said mold and solidifying said material disposed on the walls of said mold cavity and disposed against said portions of said structural member whereby said structural member becomes integrally secured to the material solidified against said mold cavity walls, and,
    (f) removing said hollow body from said mold with said structural member integrally retained therein and disposed so as to support the walls of said body.

4. A method for rotationally molding a hollow body with internal supporting means comprising the steps of:
    (a) supporting a structural frame across a cavity of a multiple piece mold and assembling said mold,
    (b) charging a fluent plastic molding material into said mold,
    (c) moving said mold in a manner to distribute said molding material against the face of the wall of said cavity and against portions of said frame closest to the walls of said cavity,
    (d) solidifying said molding material on said cavity wall to form a hollow body with portions of said frame encapsulated within said body in a manner whereby said frame is retained in place therein,
    (e) opening said mold and removing said hollow body therefrom, 5. A method for rotationally molding a hollow body of plastic having walls which are internally supported comprising the steps of:
    (a) prepositioning a structural member across the cavity of a multiple part mold by securing said member to the mold wall,
    (b) charging a predetermined quantity of a fluent plastic to be molded into the mold cavity,
    (c) closing off said mold cavity,
    (d) heating the walls of said mold,
    (e) rotating said mold in a manner to distribute said plastic substantially evenly about the wall of the cavity, and against portions of said structural member held proximate to the mold wall,
    (f) solidifying said plastic on the mold wall to define a hollow body and against said structural member to integrally fasten it within said body,
    (g) cooling said mold and thereafter opening said mold and removing said hollow body therefrom with said structural member retained therein and disposed so as to support said body.

6. A method of fabricating hollow objects comprising the steps of:
    (a) assembling a multiple part mold with a member made of thermoplastic material with said member extending across a cavity in said mold and supporting said member near both ends by securing it to portions of the mold walls adjacent the cavity, (b) charging a quantity of plastic molding material into said mold, (c) rotating said mold to cause said plastic material to become distributed against substantially the entire wall of said cavity, (d) heating said mold to heat the plastic material therein to a molten state and causing said material to become disposed against portions of said member and the wall of said cavity, and to render portions of said member adjacent said mold walls to become semi-molten, (e) solidifying the molding material into a shell conforming to the shape of said mold cavity, and, (f) welding said portions of said member rendered semi-molten to said shell by solidifying said semi-molten portions into integral assembly with said shell.

7. A method of molding an internally reinforced body from thermoplastic material comprising the steps of providing a first part of a multiple part mold having a portion of its wall shaped with a cavity defining the external surface of an article to be molded, fixedly retaining a self-supporting reinforcing member for an article to be molded in said mold in a predetermined position relative to the first part of said mold by supporting at least two portions of said member adjacent opposite portions of said mold cavity against the walls of said mold, said reinforcing member being made at least in part of a rigid thermoplastic material, assembling said first mold part with a further mold part to define a molding cavity, introducing a thermoplastic material into said cavity and causing said material to solidify as a hollow body on the wall of said mold cavity, and causing said thermoplastic portions of said member to become partly molten near said adjacent opposite portions of said mold cavity, and to fuse and become welded to the molding material solidifying on the wall of said mold cavity to provide an integral assembly with said hollow body.

8. Method of molding a vehicle having a hollow body and axles supporting wheels secured to said body comprising the steps of:

(a) assembling a multiple part mold and retaining an axle across the cavity of said mold near the bottom thereof, (b) charging a predetermined quantity of fluent molding material into said mold cavity and disposing said material against the bottom of said mold cavity and around said axle, (c) solidifying a first portion of said molding material to define the bottom wall of said hollow body and in a manner to encapsulate the portion of said axle and attach it to said bottom wall, (d) thereafter rotating said mold to cause the remaining portion of said molding material to become distributed against the rest of the walls of said mold cavity, (e) solidifying said molding material into a shell defining said hollow body and (f) removing said hollow body from said mold with said axle attached thereto.

9. A method in accordance with claim 3 in which said plastic material is provided in particulate form capable of melting on contact with the heated mold wall and of forming a molten coating thereon which solidifies as a hollow shell upon cooling said mold.

References Cited

UNITED STATES PATENTS

| | | | |
|---|---|---|---|
| 922,484 | 5/1909 | Jones | 280—1.208 |
| 1,355,254 | 10/1920 | Parsons | 264—278 |
| 1,641,793 | 9/1927 | Watson | 264—275 |
| 1,699,953 | 1/1929 | Conant | 264—273 |
| 1,732,991 | 10/1929 | Smith | 280—1.208 |
| 2,300,594 | 11/1942 | Rehfeld | 264—273 |
| 2,621,369 | 12/1952 | Gantz | 264—273 |
| 2,696,642 | 12/1954 | Kohrn | 264—275 |
| 2,726,923 | 12/1955 | Schleich | 18—36 |
| 2,760,775 | 8/1956 | Tipton | 264—279 |
| 2,935,320 | 5/1960 | Chupa | 264—279 |
| 2,944,814 | 7/1960 | Thoeming | 264—311 |
| 2,978,244 | 4/1961 | Rempel et al. | 264—311 |
| 2,959,820 | 11/1960 | Miller et al. | 264—310 |
| 3,048,896 | 8/1962 | Marlo | 264—311 |
| 3,095,260 | 6/1963 | Ferriot | 264—311 |

FOREIGN PATENTS 466,981  8/1950  Canada.
585,395  2/1947  Great Britain.

ROBERT F. WHITE, *Primary Examiner.*

RICHARD C. PINKHAM, ROY B. MOFFITT,
*Examiners.*

F. B. LEONARD, L. S. SQUIRES,
*Assistant Examiners.*